[19] United States Patent
Block et al.

(10) Patent No.: US 10,358,983 B2
(45) Date of Patent: Jul. 23, 2019

(54) ASSET DEGRADATION MODEL BASELINENING SYSTEM AND METHOD

(71) Applicant: General Electric Company, Schenectady, NY (US)

(72) Inventors: Frederick William Block, Greenville, SC (US); Scott William Szepek, Schenectady, NY (US); William Forrester Seely, Greenville, SC (US); Mustafa Tekin Dokucu, Niskayuna, NY (US); John Joseph Raffensperger, Greenville, SC (US)

(73) Assignee: General Electric Company, Schenectady, NY (US)

( * ) Notice: Subject to any disclaimer, the term of this patent is extended or adjusted under 35 U.S.C. 154(b) by 423 days.

(21) Appl. No.: 15/132,963

(22) Filed: Apr. 19, 2016

(65) Prior Publication Data
US 2017/0300018 A1 Oct. 19, 2017

(51) Int. Cl.
G05B 13/04 (2006.01)
F02C 9/00 (2006.01)
G05B 19/4065 (2006.01)

(52) U.S. Cl.
CPC ............ *F02C 9/00* (2013.01); *G05B 19/4065* (2013.01); *F05D 2260/81* (2013.01); *G05B 2219/37255* (2013.01)

(58) Field of Classification Search
None
See application file for complete search history.

(56) References Cited

U.S. PATENT DOCUMENTS

| 9,014,945 | B2 * | 4/2015 | Abrol | F02C 9/48 60/39.27 |
| 9,581,980 | B2 * | 2/2017 | Badwe | G05B 13/048 |
| 2013/0054213 | A1 | 2/2013 | Rohm, III et al. | |
| 2014/0244055 | A1 * | 8/2014 | Rosson | F02C 9/00 700/287 |
| 2014/0257666 | A1 * | 9/2014 | Abrol | F02C 9/48 701/100 |
| 2015/0047368 | A1 * | 2/2015 | Jones | F02C 9/18 60/782 |
| 2016/0365736 | A1 * | 12/2016 | Block | H02J 3/46 |

FOREIGN PATENT DOCUMENTS

EP 2549415 A1 1/2013

* cited by examiner

*Primary Examiner* — Van H Nguyen
(74) *Attorney, Agent, or Firm* — Fletcher Yoder, P.C.

(57) ABSTRACT

A system includes a model-based control system configured to receive data relating to parameters of a machinery via a plurality of sensors coupled to the machinery and select one or more models configured to generate a desired parameter of the machinery based on a determined relationship between the parameters and the desired parameter. The one or more models represent a performance of a device of the machinery. The model-based control system is configured to generate the desired parameter using the data and the one or more models control a plurality of actuators coupled to the machinery based on the desired parameter. Further, the model-based control system is configured to empirically tune the one or more models based on the data, the one or more parameters, and the desired parameter, compare the empirical tuning to a baseline tuning, and determine an operational state of the device based on the comparison.

20 Claims, 5 Drawing Sheets

ASSET DEGRADATION MODEL BASELINENING SYSTEM AND METHOD

BACKGROUND OF THE INVENTION

The subject matter disclosed herein relates to power generation systems and asset degradation. In particular, the embodiments described herein relate to control systems for power generation systems suitable for modeling base-lining of certain asset degradations.

Many control systems for power generation systems may use a variety of models to predict the performance of the power generation system and control various aspects of the system based on the prediction. These models may be physics-based models that predict performance based on the relationships between the components of the power generation system, physics of the component materials, and the operating environment. Often, these models may be determined based on known physical relationships between parameters (e.g., a known relationship between pressure and volume) as well as relationships captured through both lab and on-site testing.

To determine the state of one or more components of the power generation system, the control system may use one or more baselines that describe the operation of a device or system in a particular state (e.g., operating normally, slight degradation, moderate degradation, etc.). These baselines may be determined by the manufacturer(s) of the power generation system and/or the individual components, or in lab and on-site testing. Each baseline may represent a single parameter of the device or system or an attribute of a material affected by the device or system. The control system may also include one or more sensors configured to measure these parameters of or associated with the devices and systems, which may then be compared to the baselines to determine the state of the devices and systems.

However, the baselines used by the control system may be static in nature. For example, the baselines may be a singular value or set of values that does not change to account for varying operating conditions (i.e., each baseline represents the state of a device or system in a particular operating condition). In such cases, the control system may then contain several baselines related to a device or system, each representing the state of the device or system for a different operating condition. Additionally, the baselines may not be updated to account for the usage of the device or system over time. Even if the baselines are updated, those updates may be infrequent (e.g., baselines are updated only when a component is moved and installed in a new system). Further, the process of updating the baselines may be a manual process. Accordingly, it would be beneficial to have a system or method for dynamically adjusting the baselines used to evaluate the performance of various devices and systems in a power generation system.

BRIEF DESCRIPTION OF THE INVENTION

In one embodiment, a system includes a model-based control system configured to receive data relating to one or more parameters of a machinery via a plurality of sensors coupled to the machinery and select one or more models configured to generate a desired parameter of the machinery based on a determined relationship between the one or more parameters and the desired parameter. The one or more models represent a performance of a device of the machinery. The model-based control system is also configured to generate the desired parameter using the data and the one or more models control a plurality of actuators coupled to the machinery based on the desired parameter. Further, the model-based control system is configured to empirically tune the one or more models based on the data, the one or more parameters, and the desired parameter, compare the empirical tuning to a baseline tuning, and determine an operational state of the device based on the comparison.

In another embodiment, method includes receiving data from a plurality of sensors coupled to machinery configured to produce power, wherein the data correspond to one or more parameters of the machinery. The method also includes selecting one or more models configured to generate a desired parameter of the machinery based on a determined relationship between the one or more parameters and the desired parameter. The one or more models represent the performance of a device of the machinery. Further, the method includes generating the desired parameter using the data and the one or more models. The method also includes performing regression analysis to update the one or more models using the data, the one or more models, and the desired parameter, wherein performing the regression analysis comprises calculating one or more coefficients. The method then includes comparing the updated one or more models, the one or more coefficients, or any combination thereof to a baseline tuning and determining an operational state of the device based on the comparison.

In yet another embodiment, a non-transitory, computer-readable medium includes computer executable code having instructions. The instructions are configured to receive one or more parameters of machinery configured to produce power, one or more desired parameters of the machinery, and one or more models that represent a determined relationship between the one or more parameters and the one or more desired parameters and a performance of one or more devices of the machinery. The instructions are also configured to perform regression analysis to determine one or more coefficients to apply to the one or more models and adjust the one or more models using the one or more parameters, the one or more desired parameters, and the one or more models. Further, the instructions are configured to compare the one or more adjusted models, the one or more coefficients, or any combination thereof to a baseline model, a baseline set of coefficients, or any combination thereof and determine an operational state of the one or more devices based on the comparison. Additionally, the instructions are configured to adjust the baseline model, the baseline set of coefficients, or any combination thereof based on a result of the regression analysis; and store the adjusted one or more models, the one or more coefficients, the adjusted baseline model, the adjusted baseline set of coefficients, or any combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
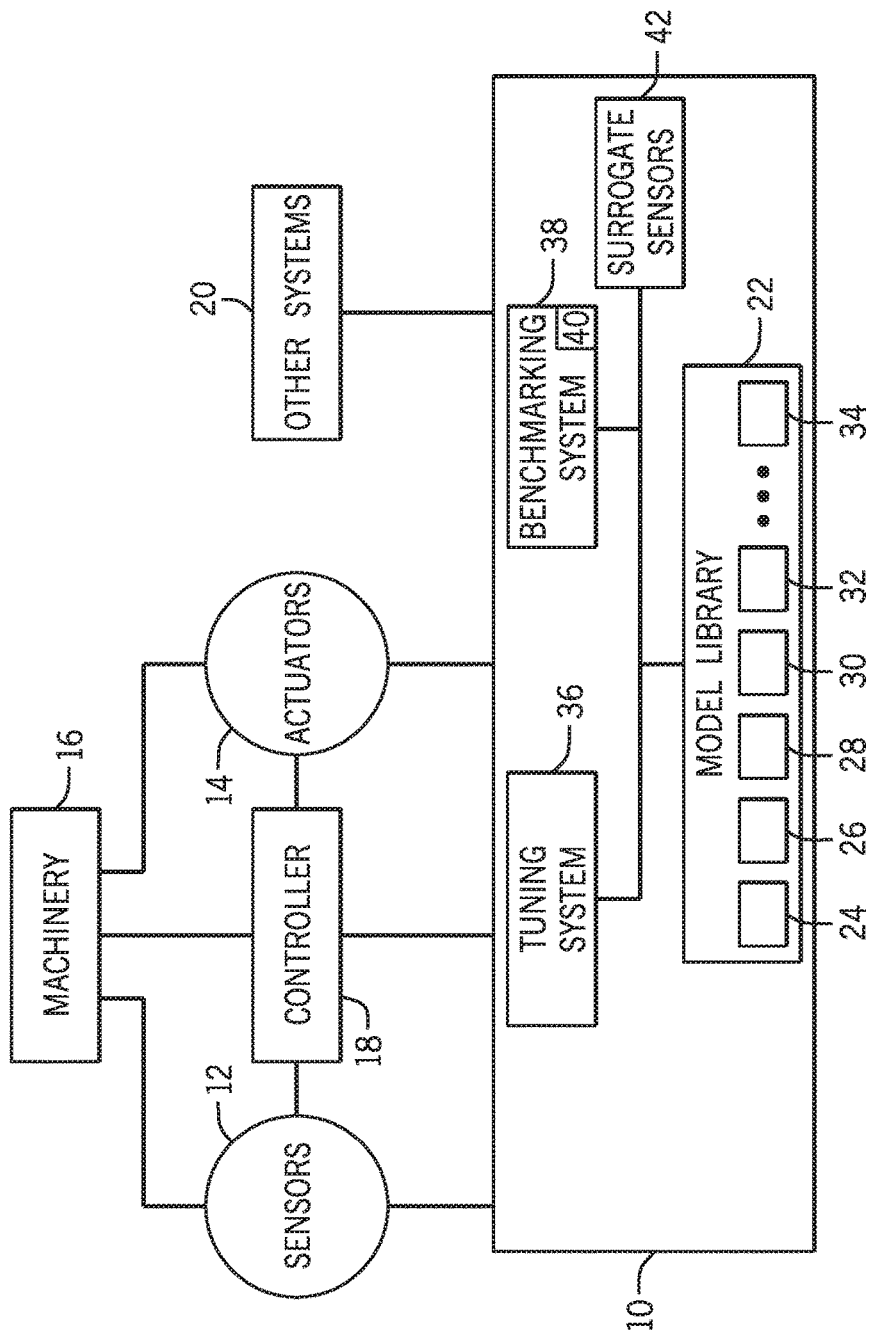
FIG. 1 illustrates a block diagram of a model-based control system that may be used to control power production machinery, in accordance with an embodiment of the present approach.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Power generation systems may include a control system configured to, among other things, perform benchmarking tests for the component devices and systems of the power generation system. The control system may contain one or more baselines; each baseline may represent a parameter associated with a particular device or system. For example, one baseline for a pump may be mechanical efficiency. The control system may also include or be coupled to one or more sensors that may measure the parameters of the baselines. The control system may receive the measured values of the parameters, compare the measured values to the baselines, and determine the operational state of the device (e.g., operating normally, slight degradation, moderate degradation, etc.) based on the comparison. However, the baselines may not be updated over time to account for the normal usage of the various components of the power generation system.

To dynamically update the baselines, present embodiments may include a model-based benchmarking system, which may be part of a larger model-based tuning and control system. The model-based tuning and control system may control the power generation system using a variety of models, which in turn may be empirically tuned to increase the accuracy of the models. The model-based benchmarking system may include one or more dynamic baselines for each component of the power generation system; these dynamic baselines may either be the empirically tuned models or the tuning itself that would be expected for the component(s) in a particular operating condition. The model-based benchmarking system then compares the empirically tuned models or the tuning as determined by the overarching control system to the dynamic baselines. Based on the comparisons, the model-based benchmarking system may determine the operational state of the corresponding component(s).

As the model-based benchmarking system uses dynamic baselines (e.g., which may be derived via surrogate sensors described below), the system may distinguish between expected variations in performance that occur as the models, and subsequently, the baselines adjust, and larger departures from the baselines that represent equipment degradation and/or failure. Further, using dynamic baselines may enable the model-based benchmarking system to adjust the baselines in response to the variations in performance that occur due to the usage of a particular device or system over time. In certain embodiments, the model-based benchmarking system may also save the dynamic baselines over time, such that the model-based benchmarking system may evaluate the historical values of the baselines to predict equipment degradation and/or failure.

With the foregoing in mind, FIG. 1 is a block diagram illustrating an embodiment of a model-based control system (MBCS) 10 that may be communicatively coupled to sensors 12 and actuators 14, which in turn may be coupled to machinery 16. The sensors 12 may provide inputs to the MBCS 10, and may include, for example, pressure sensors, temperature sensors, flow sensors, status and position indicators (e.g. limit switches, Hall effect switches, acoustic proximity switches, linear variable differential transformers (LVDTs), position transducers), and the like, connected to and the machinery 16. The actuators 14 may include switches, valves, motors, solenoids, positioners, and other devices, suitable for moving or controlling a mechanism or system within the machinery 16. The machinery 16 may be any type of turbomachinery, power production machinery (e.g., gas turbine system, steam turbine system, wind turbine system, hydro-turbine system, combustion engine, hydraulic engine, electric generator), and non-power production machinery (e.g., pump, valve).

In certain embodiments, the MBCS 10 may be provided as a subsystem of a controller 18 that is coupled to the machinery 16 and may control the actuators 14. In such embodiments, the MBCS 10 may include non-transitory machine readable media storing code or computer instructions that may be used by a computing device (e.g., the controller 18) to implement the techniques disclosed herein. In other embodiments, the MBCS 10 may constitute the entirety of the controller 18; that is, the MBCS 10 may be responsible for all of the control responsibilities for the machinery 16. In still other embodiments, the MBCS 10 may be included in a distributed control system (DCS), a manufacturing execution system (MES), a supervisor control and data acquisition (SCADA) system, and/or a human machine interface (HMI) system.

The MBCS 10 may also be coupled to other systems 20, such as electronic logs (e.g., maintenance databases), paper logs, power production logs, manufacturer records (e.g., expected lifetime data, repair data, refurbishment data), industry records (e.g., industry failure rate data, industry standards), economic markets (e.g., power futures market, cap and trade markets, "green" credit markets), regulatory systems (e.g., regulatory compliance systems, pollution control systems), insurance systems (e.g., lost power production revenue insurance, business interruption insurance), maintenance optimization systems, operational optimization systems, economic optimization systems, and so on. The MBCS 10 may use the data provided by the other systems 20 to tune the models used to determine the performance of the machinery 16, which is described in further detail below.

As shown in FIG. 1, the MBCS 10 may include a model library 22 containing models 24, 26, 28, 30, 32, and 34. The models 24-34 may include various types of relationships between certain measurements or parameters of the machinery 16 during operations of the machinery 16. In certain embodiments, the models 24-34 may be physics-based models determined based on known physical relationships between parameters (e.g., a known relationship between pressure and volume) as well as relationships captured through both lab and on-site testing. The MBCS 10 may also include a tuning system 36, which may tune the models 24-34 as described further below. Additionally, the MBCS 10 may include a benchmarking system 38, containing and/or deriving several baselines 40. Each baseline 40 may represent a parameter associated with a device or system in the machinery 16, and may be dynamically updated using the results of the tuning system 36, as described in further detail below. The benchmarking system 38 may receive data related to the measured values of various parameters from the sensors 12 and compare the measured values to the baselines 40 to determine the operational state (e.g., normal operation, slight degradation, moderate degradation, etc.) of the corresponding device or system in the machinery 16.

In certain embodiments, the MBCS 10 may also include surrogate sensors 42. Although the surrogate sensors 42 may essentially be physical sensors 12, the MBCS 10 may use the data collected by the surrogate sensors 42 as inputs to derive virtual sensors "measuring" values that may have different types as those measured by the surrogate sensor 42. For example, the surrogate sensor 42 may physically measure pressure, while the derived virtual sensor based on data collected via the surrogate sensor 42 may "measure" temperature, as will be described in further detail below.

Figure 2:
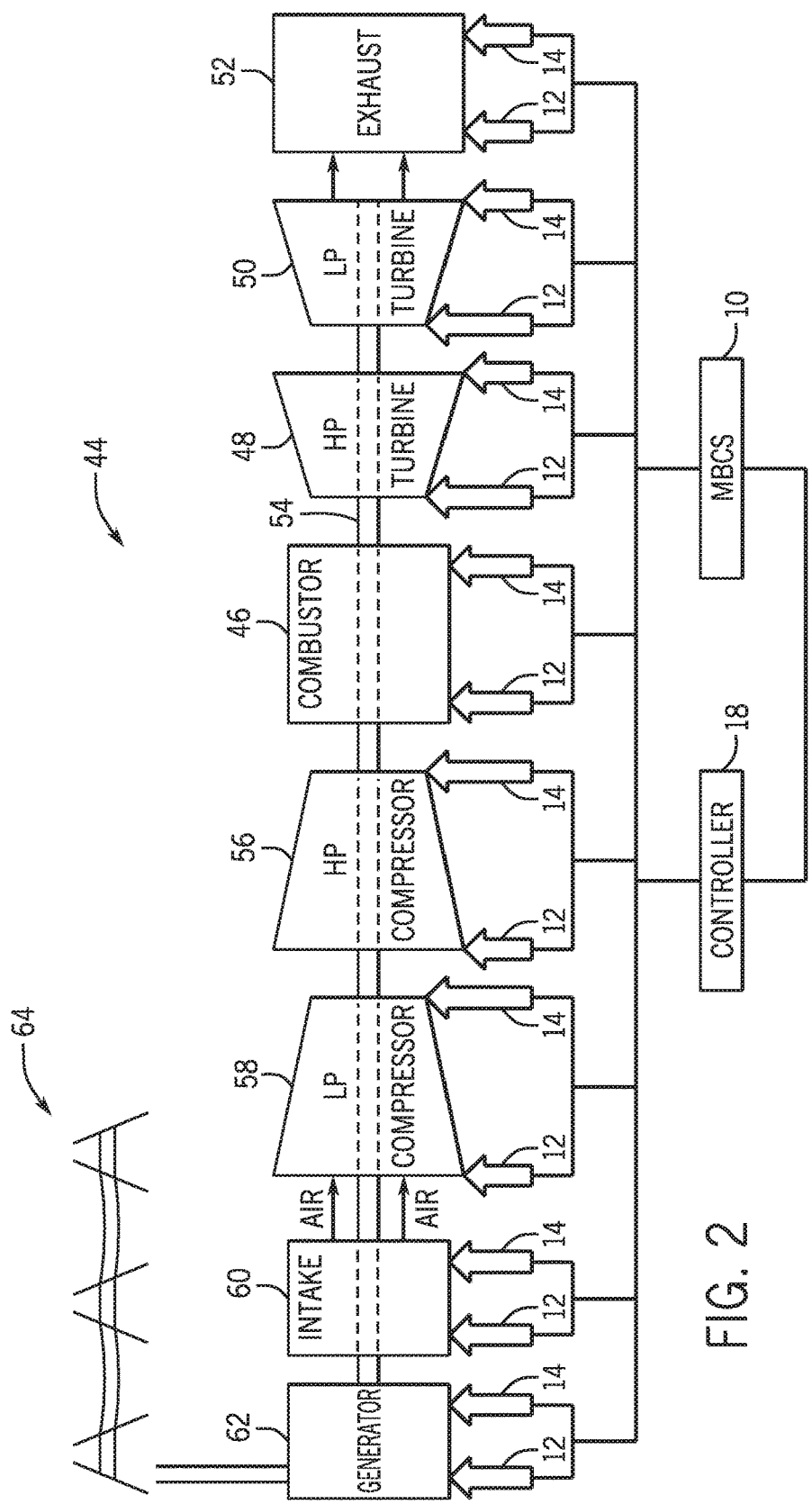
FIG. 2 illustrates a block diagram of the components of the power production machinery and the model-based control system of FIG. 1, in accordance with an embodiment of the present approach.

Turning now to FIG. 2, an example of using the MBCS 10 to apply model tuning and benchmarking to the machinery 16 is provided. The machinery 16 in the depicted embodiment is in the form of a turbine system 44. As depicted, the turbine system 44 may include a combustor 46, which may receive fuel that has been mixed with air for combustion in a chamber within the combustor 46. This combustion creates hot pressurized exhaust gases. The combustor 46 directs the exhaust gases through a high pressure (HP) turbine 48 and a low pressure (LP) turbine 50 toward an exhaust outlet 52. The HP turbine 48 may be part of a HP rotor. Similarly, the LP turbine 50 may be part of a LP rotor. As the exhaust gases pass through the HP turbine 48 and the LP turbine 50, the gases force turbine blades to rotate a drive shaft 54 along an axis of the turbine system 44. As illustrated, drive shaft 54 is connected to various components of the turbine system 44, including a HP compressor 56 and a LP compressor 58.

The drive shaft 54 may include one or more shafts that may be, for example, concentrically aligned. The drive shaft 54 may include a shaft connecting the HP turbine 48 to the HP compressor 56 to form a HP rotor. The HP compressor 56 may include blades coupled to the drive shaft 54. Thus, rotation of turbine blades in the HP turbine 48 causes the shaft connecting the HP turbine 48 to the HP compressor 56 to rotate blades within the HP compressor 56. This compresses air in the HP compressor 56. Similarly, the drive shaft 54 includes a shaft connecting the LP turbine 50 to the LP compressor 58 to form a LP rotor. The LP compressor 58 includes blades coupled to the drive shaft 54. Thus, rotation of turbine blades in the LP turbine 50 causes the shaft connecting the LP turbine 50 to the LP compressor 58 to rotate blades within the LP compressor 58. The rotation of blades in the HP compressor 56 and the LP compressor 58 compresses air that is received via an air intake 60. The compressed air is fed to the combustor 46 and mixed with fuel to allow for higher efficiency combustion. Thus, the turbine system 44 may include a dual concentric shafting arrangement, wherein LP turbine 50 is drivingly connected to LP compressor 58 by a first shaft portion of the drive shaft 54, while the HP turbine 48 is similarly drivingly connected to the HP compressor 56 by a second shaft portion of the drive shaft 54 internal and concentric to the first shaft. The drive shaft 54 may also be connected to an electrical generator 62. The generator 62 may be connected to an electrical distribution grid 64 suitable for distributing the electricity produced by the generator 62.

As shown in FIG. 2, multiple sensors 12 and actuators 14 may be disposed in or around various components of the turbine system 44. The sensors 12 may be configured to collect data regarding various parameters related to the operation and performance of the turbine system 44, such as parameters related to the components of the turbine system 44 as well as certain materials (e.g., air, fuel, etc.) inputted into or outputted by the turbine system 44. For example, the sensors 12 may measure environmental conditions, such as ambient temperature and ambient pressure, as well as a plurality of engine parameters related to the operation and performance of the turbine system 40, such as, exhaust gas temperature, rotor speed, engine temperature, engine pressure, gas temperature, engine fuel flow, vibration, clearance between rotating and stationary components, compressor discharge pressure, exhaust emissions/pollutants, and turbine exhaust pressure. In certain embodiments, the sensors 12 may also measure data related to the actuators 14, such as valve position, and a geometry position of variable geometry components (e.g., air inlet).

Typically, in model-based control systems, the data collected by the sensors 12 is inputted into the models, which generates data quantifying the operation and performance of the machinery 16. Based on the generated data, the control system then determines a number of control actions to take in order to improve and/or maintain the performance of the machinery 16 and controls the actuators 14 as necessary to perform the control actions. For example, to determine the compressor pressure ratio of the HP compressor 56 or the LP compressor 58, one or more pressure sensors 12 may be disposed in the drive shaft 54 before and after the HP compressor 56 and the LP compressor 58. The measured pressure values may then be inputted into one or more models (e.g., models 24-34), which may generate the compressor pressure ratio of the HP compressor 56 or the LP compressor 58.

Typically, the models used by the model-based control systems may be tuned, in that certain parameters and/or constants in the physical and/empirical relationships between parameters may be adjusted in order to improve the accuracy of the models. However, while the models may be tuned to account for variations in field conditions, such tuning typically occurs only during commissioning of the machinery 16. That is, the models may be tuned, usually manually, when the machinery 16 and the controller 18 are installed. The models may not be re-tuned to account for variations in field conditions that occur due to the operation and/or degradation of the sensors 12, the actuators 14, and components of the machinery 16. Further, once the models are tuned during the initial installation of the machinery 16 and the controller 18, the models may not be re-tuned if any components of the machinery 16 and the controller 18 are updated or replaced. Additionally, the models may not be individually tuned to account for different modes of operations for the machinery 16 or to account for behavior observed in other machinery 16 (e.g., fleet behavior).

Similarly, as noted above, the benchmarking system 38 within a model-based control system may include several baselines 40. Each baseline 40 may represent a parameter associated with a device or system in the machinery 16 for a particular operating condition. Following the earlier example, a baseline 40 may be the compressor pressure ratio of the HP compressor 56 or the LP compressor 58 when the machinery 16 is running in a lean mode. However, the baselines 40 may not be adjusted to account for the varying operating conditions of the machinery 16. That is, the benchmarking system 38 may contain, for each desirable parameter of a device or system, several baselines 40, each containing the preferred value of the parameter for the device or system in a particular operation condition. Similarly, the baselines 40 may also not be adjusted to account for the usage of the machinery 16 over time.

To improve the accuracy of the models 24-34 and the baselines 40 and the performance of the machinery 16, the MBCS 10 may use the tuning system 36 and the benchmarking system 38 to automatically tune the models 24-34 and adjust the baselines 40 respectively, as noted above. In particular, the MBCS 10 may receive measured values that relate to a desired measurement or parameter of the machinery 16. The MBCS 10 may then select one of the models 24-34 and may use the selected model to derive the desired measurement(s) or parameter(s) based on the measured values. The tuning system 36 may then tune the selected models based on the measured values and/or the relationship between the measured values and the desired measurement(s) or parameter(s).

Further, the benchmarking system 38 may select one or more baselines 40, which may include critical parameters that represent the performance of a particular device or system. The baselines 40 may be either expected empirically tuned models 24-34 and/or the tuning applied to the models 24-34 by the tuning system 36, as described below. The benchmarking system 38 may then compare the empirically tuned models 24-34 and/or the tuning determined by the tuning system 36 to the baselines 40, and determine the operational state of the corresponding device or system. Specifically, the benchmarking system 38 may be configured to distinguish between expected variations in performance, especially as the machinery 16 goes through varying operating conditions, and major deviations from the baselines 40 that may indicate equipment degradation and failure. The baselines 40 may automatically adjust as they are based on the empirically tuned models and/or the tuning applied to the models, which is described in further detail below. Additionally, in certain embodiments, the benchmarking system 38 may be configured to store the various values of the baselines 40 over time, such that the benchmarking system 38 may perform a historical evaluation of the baselines 40 to predict future operational states of a device or system.

Figure 3:
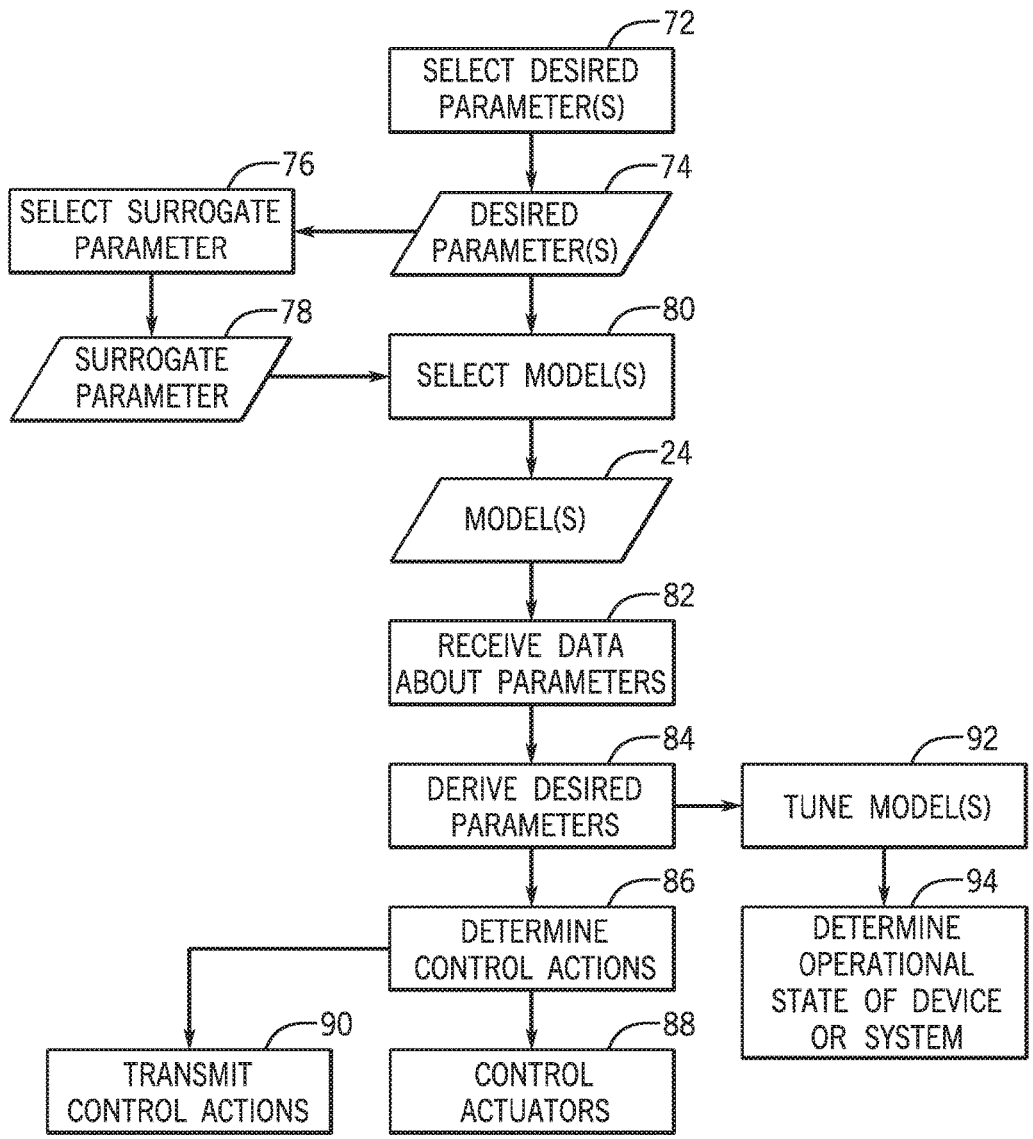
FIG. 3 illustrates a flow chart for a process that the model-based control system of FIG. 1 may use to control the power production machinery, improve the models of the control system, and benchmark the devices and systems of the power production machinery, in accordance with an embodiment of the present approach.

FIG. 3 illustrates an embodiment of a process 70 that the MBCS 10, the tuning system 36, and the benchmarking system 38 may use to determine a desired measurement or parameter of the machinery 16, tune the models 24-34, and perform benchmarking of a device or system in the machinery 16. Although the process 70 is described below in detail, the process 70 may include other steps not shown in FIG. 3. Additionally, the steps illustrated may be performed concurrently or in a different order. The process 70 may be implemented as computer instructions or executable code, for example, stored in the memory and executed by the processor of the MBCS 10 and the controller 18.

Beginning at block 72, the MBCS 10 may select a desired measurement or parameter of the machinery 16 to derive. For instance, the MBCS 10 may select the air pressure of the drive shaft 54 as a desired parameter 74. In certain embodiments, at block 76, the MBCS 10 may then select one or more surrogate measurements or parameters 78 that may be related (e.g., mathematically related) to the desired parameter 74. The surrogate parameter(s) 78 may be determined based on, for example, certain relationships between two variables. Following the earlier example, the MBCS 10 may select air temperature in the drive shaft 54 as a surrogate parameter 78 based on the relationship between pressure and temperature in the form of Boyle's law or an ideal gas law (e.g., Pressure×Volume=n×R×T, where n is number of moles, R is a universal gas constant, and T is temperature). In other embodiments, the surrogate measurements of parameter(s) 78 may be determined based on empirically determined relationships between two types of measurements or parameters (e.g., relationships determined via lab and/or field testing).

After the MBCS 10 determines the desired parameter(s) 74 and, in certain embodiments, the surrogate parameter(s) 78, the MBCS 10 may then select one or more models 24-34 from the model library 22 at block 80. As will be appreciated, the models 24-34 may represent a factor indicative of the performance of a particular component of the machinery 16. This representation may be directly or indirectly related to a particular parameter. For example, a model 24 configured to determine the efficiency of a compressor (e.g., the HP compressor 56 or the LP compressor 58) may rely solely on the pressure measurements needed to determine the compressor pressure ratio. In another example, the models 24-34 may describe one or more relationships between surrogate measurement(s) or parameter(s) 78 and the desired measurement(s) or parameter(s) 74. Once the MBCS 10 selects the model(s) 24-34, the MBCS 10 may receive data representative of various parameters via the sensors 12 at block 82. This block may include receiving data representative of the surrogate measurement(s) or parameters 78 via the surrogate sensors 42. As noted above, the surrogate sensors 42 are sensors 12 disposed within and around the machinery 16. However, they are designated as surrogate sensors 42 to reflect that the data collected by the surrogate sensors 42 is used specifically to determine the desired measurement(s) or parameter(s) 74.

At block 84, the MBCS 10 then uses the received data and the model(s) 24-34 to derive the desired measurement(s) or parameter(s) 74. Once the MBCS 10 derives the desired measurement(s) or parameter(s) 74, the MBCS 10 may then determine one or more control actions to take at least partially based on the derived desired measurement(s) or parameter(s) at block 86. For example, the MBCS 10 may derive an air-to-fuel ratio as the desired parameter 74, and then adjust a position of a corresponding fuel valve based on the derived air-to-fuel ratio (e.g., close the valve if the air-to-fuel ratio is low). The MBCS 10 may then either control the actuators 14 directly to perform the control actions or transmit the control actions to a separate controller, such as the controller 18, at blocks 88 and 90, respectively.

In addition to controlling the actuators 14, the MBCS 10 also uses the tuning system 36 to tune the model(s) 24-34 at block 92, as shown in FIG. 3. In one embodiment, the tuning system 36 may perform real-time regression analysis of the model(s) 24-34. Specifically, the tuning system 36 may use a least-squares fitting method that includes summations of various variables to determine the best model for the relationship between measured values, surrogate parameter(s), and the desired parameter(s). In other embodiments, the tuning system 36 may use other empirical methods for tuning the model(s) 24-34, such as matrix algebra, fuzzy logic, neural networks, neuro-fuzzy models, and so forth.

Once the model(s) 24-34 are empirically tuned (block 92), the MBCS 10 uses the benchmarking system 38 to determine the operational state of a device or system at block 94. In particular, the benchmarking system 38 may compare the empirically tuned model(s) 24-34 or the tuning applied to the model(s) 24-34 to the baselines 40 and determine an operational state based on the comparison. As noted above, the baselines 40 may include empirically tuned models and/or the expected tuning applied to the models.

Figure 4:
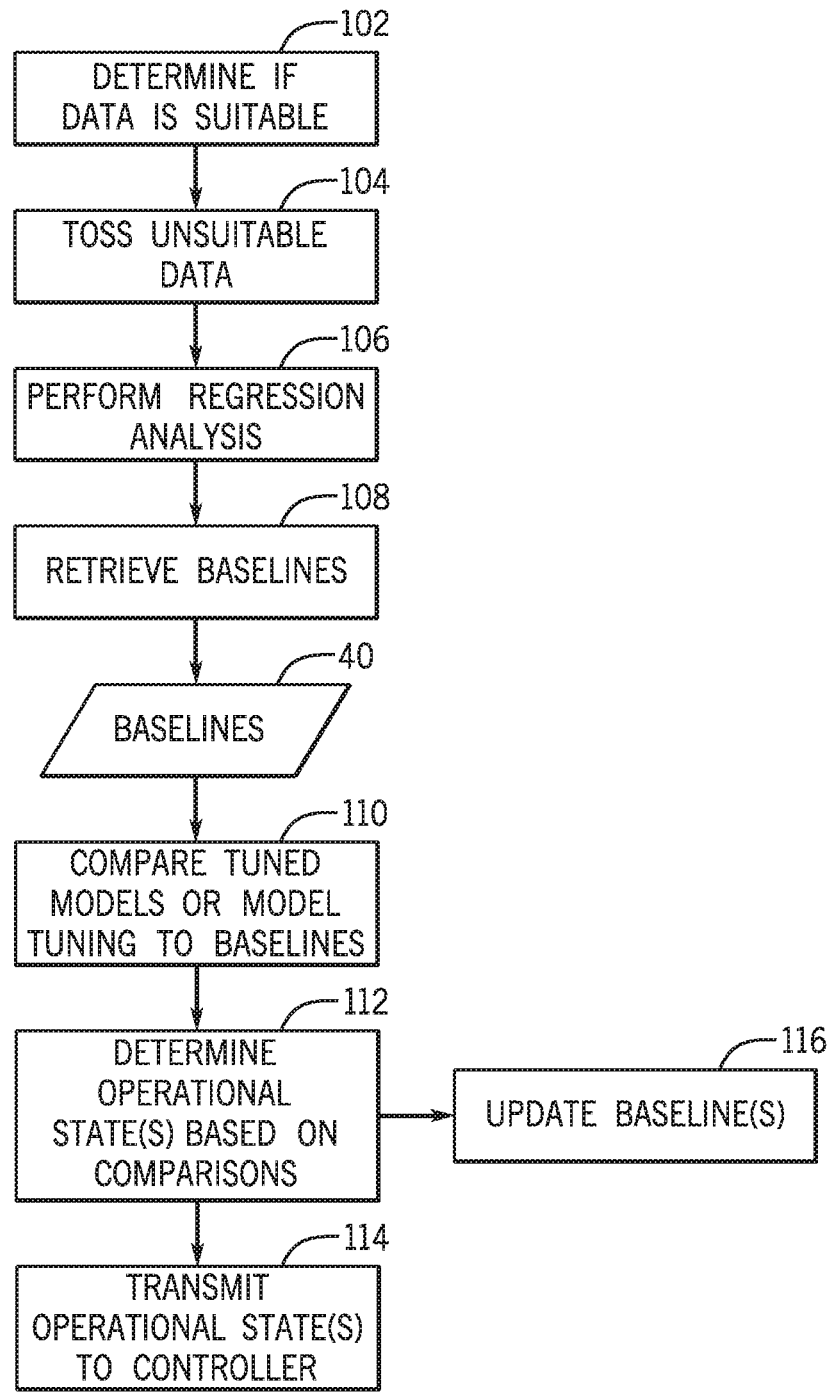
FIG. 4 illustrates a flow chart for a process that the process of FIG. 3 may use to improve the models of the control system and benchmark the devices and systems of the power production machinery, in accordance with an embodiment of the present approach.

FIG. 4 illustrates an embodiment of a process 100 that the tuning system 36 and the benchmarking system 38 may use to tune the models 24-34 during block 92 and determine the operational state of a device or system during block 94, respectively, of the process 70. Although the process 100 is described below in detail, the process 100 may include other steps not shown in FIG. 4. Additionally, the steps illustrated may be performed concurrently or in a different order. The process 100 may be implemented as computer instructions or executable code stored, for example, in the memory and executed by the processor of the MBCS 10 and the controller 18.

Beginning at block 102, the tuning system 36 may determine whether the data collected by the sensor(s) 12 and/or 42 is suitable. For instance, certain boundary measurements/parameters may be used to set boundary conditions for various measurement(s)/parameter(s), outside of which the data for the measurement(s)/parameter(s), and, subsequently, the operation of the sensors 12, may be unsuitable. At block 104, the tuning system 36 may discard any unsuitable data. As noted above, the MBCS 10 may use multiple measurement(s)/parameter(s), both in type and number, to determine the desired measurement/parameter 74. Accordingly, the data collection process may be robust enough to withstand discarding a portion of the data. Further, in certain embodiments, if the tuning system 36 determines that a majority of the data related to the measurement(s)/parameter(s) is unsuitable, the tuning system 36 may configure the MBCS 10 to rely solely on the current version of the model(s) 24-34 until more suitable data is available.

Next, at block 106, the tuning system 36 may perform, for example, a regression-type analysis on the model(s) 24-34 using, for example, Equation 1 below, wherein y_desired is equivalent to the desired parameter 74, x is equivalent to the output of the relationship between the desired parameter 74, the measured data, and any surrogate parameter(s) 78 (e.g., models 24-34) and z is equivalent to the measured data and any surrogate parameter(s) 78. The variables a, b, and c may be found using summations in a least squares fitting framework as described above. In this particular embodiment, the physics based model(s) 24-34 are empirically tuned in real-time during operation of the machinery 16. As will be appreciated, although the embodiments described herein may use Equation 1 to perform quadratic regression analysis, other equations or sets of equations may be used to determine the "best" fit for the model. For example, other equations may use varying number of desired parameters, measured values, surrogate parameters, and learned (i.e., empirical) values. Further, in other embodiments, the tuning system 36 may use another type of regression analysis.

$$y\_desired = (az^2 + bz + c)x \quad (1)$$

In certain embodiments, when using regression analysis (e.g., Equation 1), the tuning system 36 may account for various zones when deriving the "best" fit for the mode. That is, the tuning system 36 may tune the models 24-34 based on independent modes of operation of the machinery 16. For example, the machinery 16 may have various modes of operation based on the desired emissions level of the machinery 16 (e.g., low emissions mode), based on the desired speed of the power generation devices of the machinery 16, combustion modes, or any number of factors. Accordingly, when performing the regression analysis, the tuning system 36 may also receive information relating to various zones that represent the modes of operation for the machinery 16. Based on the zone information, the tuning system 36 may determine when the machinery 16 enters a new mode of operation, and relay that information to the MBCS 10 and the benchmarking system 38. Alternately or additionally, the MBCS 10 or the benchmarking system 38 may determine when the machinery 16 enters a new mode of operation and relay that information to the other components. Once the tuning system 36 determines that the machinery 16 has entered a new mode, the tuning system 36 may revert the model(s) 24-34 to their state(s) before the mode begin. That is, the tuning system 36 may restore the model(s) 24-34 to a default, un-tuned version once the mode of operation ends. In certain embodiments, the tuning system 36 may also store the tuned model(s) 24-34 and the associated zone information in the memory of the MBCS 10 so that the MBCS 10 may immediately retrieve and use the tuned model(s) 24-34 when the machinery 16 enters that particular mode of operation again.

At block 108, the benchmarking system 38 may retrieve any number of baselines 40; the selected baselines 40 may be chosen based on the schedule for benchmarking various devices and systems (e.g., benchmarking a pump every 1000 cycles, benchmarking a combustor every 2 weeks), the mode of operation of the machinery 16, and other factors. As noted above, the baselines 40 may be expected versions of empirically tuned models 24-34 or the tuning applied to the models 24-34, such as the summations described above. Since the models 24-34 represent the relationship between two or more parameters of the MBCS 10, they essentially represent the performance of one or more devices or systems within the MBCS 10. Accordingly, using the empirically tuned models 24-34 may represent the performance of a device as embodied in one or more critical parameters. Additionally, using models or summations as a baseline 40 may also incorporate the effects of multiple system parameters that vary over time but are not directly measurable.

The benchmarking system 38 may then compare the empirically tuned models 24-34 or the tuning applied to the models 24-34 to the selected baselines 40 at block 110. Next, at block 112, the benchmarking system 38 may determine the operational state of various devices or systems based on the results of the comparison in block 112. For example, based on the comparison between a baseline 40 quantifying the air pressure of the drive shaft 54 and the actual model(s) 24-34 for deriving the air pressure, the benchmarking system 38 may determine that the operational state of the drive shaft 54 is operating normally and possible failure, in which a portion of the wall of the drive shaft 54 may be breached. As will be appreciated, there may be any number of operational states for a particular device or systems. For instance, in the earlier example of the drive shaft 54, there may be two operational states—either the shaft is intact, or it is not. However, for a more complex system or device, there may be more operational states. For the combustor 46, for example, the benchmarking system 38 may choose from a number of operational states such as operating at or near optimal levels, operating at acceptable levels, operating at warning levels, operating at critical levels, etc. At block 114, the benchmarking system 38 may then communicate the operational state(s) to the controller 18, which may then initiate certain control procedures (e.g., operator alert, shutdown, etc.) based on the operational state(s). In other embodiments, the benchmarking system 38 may initiate certain control procedures if necessary.

In addition to determining the operational state(s) of device(s) and/or system(s), the benchmarking system 38 may also update the baselines 40 at block 116. As stated above, the baselines 40 may be either the empirically tuned model(s) 24-34 or the tuning applied to the model(s). Accordingly, the benchmarking system 38 may be configured to update the baselines 40 as new empirical data becomes available. For instance, for baselines 40 that are the tuning applied to models 24-34, i.e. summations, the benchmarking system 40 may update the baselines 40 after each tuning and comparison. In another embodiment, the benchmarking system 38 may update the baselines 40 whenever a certain threshold of "suitable" data is reached (e.g., no more than 10% of data from the sensors is deemed unsuitable and discarded). As will be appreciated, there may be any number of metrics, schedules, and/or requirements used to determine when to update the baselines 40.

In such embodiments where the baselines 40 are dynamic (e.g., periodically updated by the benchmarking system 38), the benchmarking system 38 may be configured to determine whether any differences between the baselines 40, the empirically tuned model(s) 24-34, and/or the summations are reasonable variations due to normal operation or unreasonable variations that warrant a change in the operational state of a device or system. For instance, the benchmarking system may determine that while there is a large variation in the baseline/critical parameters within a period of time (e.g., an hour) is expected as the power generation system switched from one mode of operation to another (e.g., between combustion modes). In another example, the system may determine that such a large deviation does indicate equipment degradation, as there have been no other changes in operating conditions.

In certain embodiments, the benchmarking system 38 may also store the baselines 40 over time. In these embodiments, the benchmarking system 38 may then evaluate the historical values of the baselines 40 to additionally determine the operational state(s) of devices and systems and predict equipment degradation and times for replacement and reconfiguration.

Figure 5:
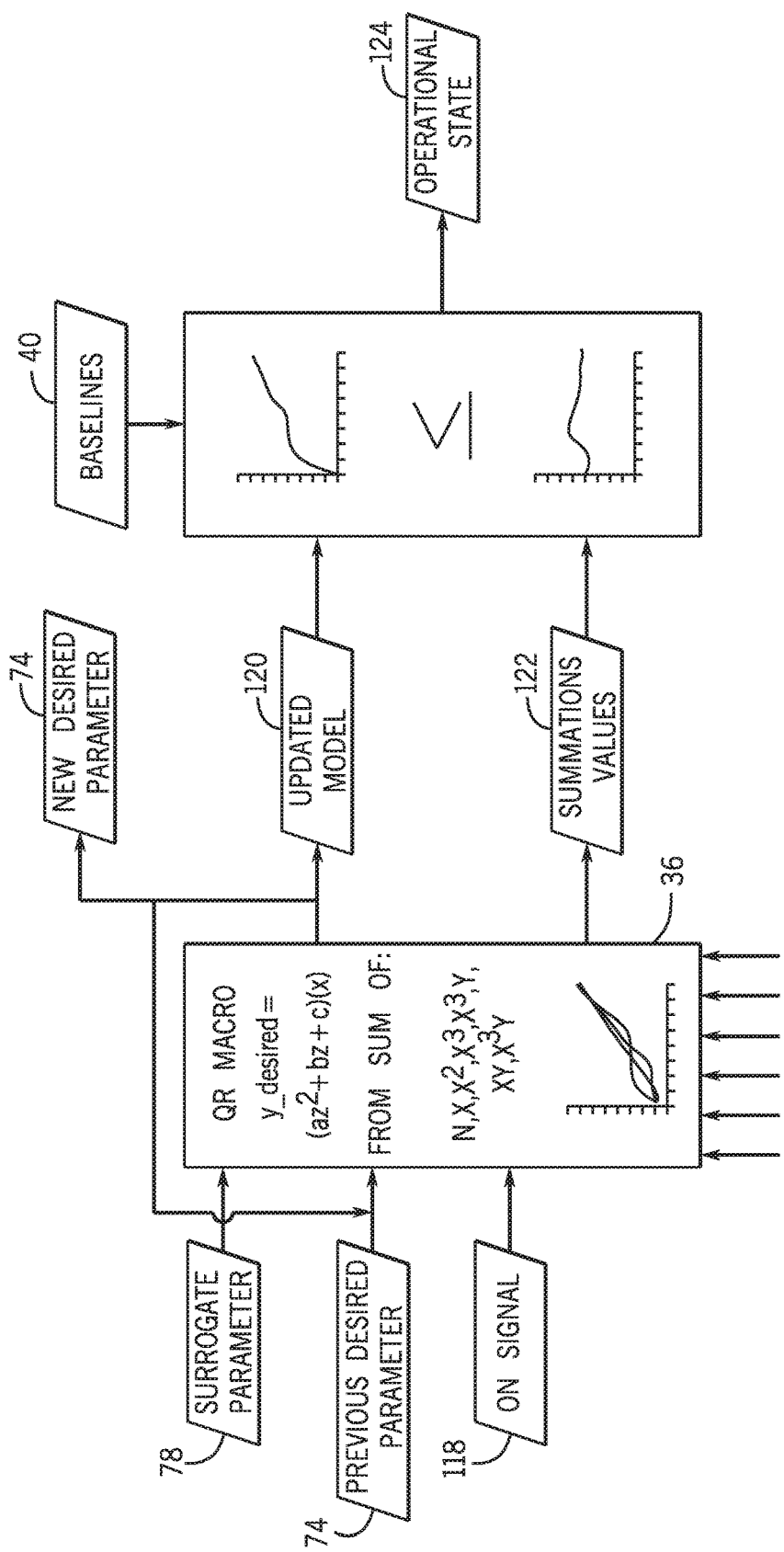
FIG. 5 illustrates a block diagram depicting the information flow of the process of FIG. 4, in accordance with an embodiment of the present approach.

FIG. 5 depicts a block diagram of an exemplary configuration embodiment of the MBCS 10, the tuning system 36, and the benchmarking system 38. As shown, the tuning system 36 may receive the previous desired parameter 74 and, in certain embodiments, the surrogate parameter 78 as inputs. Further, the tuning system 36 may also receive an ON signal 118 that tells the tuning system 36 whether to tune the model 24.

Based on these inputs, the tuning system 36 may perform the regression analysis to tune the model 24, as noted above. The tuning system 36 may then output an updated model 120. As will be appreciated, the updated model 120 may be a copy of the previous models 24-34 when no tuning is applied. The tuning system 36 may also output the values 122 of the summations; in certain embodiments, these values 122 may be stored in the memory of the tuning system 36 and may be used to reduce the computational time and resources for calculating future summations. After tuning, the tuning system 36 may be used to generate a new value for the desired parameter 74, which is then inputted into the tuning system 36 to tune the model(s) 24-34.

The benchmarking system 38 may then receive the updated model 120 and the summations 122. The benchmarking system 38 may also receive the baseline(s) 40 as well. The benchmarking system 38 may then compare the updated model 120 and/or the summations 122 to the baseline(s) 40 and determine an operational state 124 of a system or device based on the comparison, as noted above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a model-based control system comprising a processor, the processor configured to:
   receive data relating to one or more parameters of a machinery via a plurality of sensors coupled to the machinery;
   select one or more models configured to generate a desired parameter of the machinery based on a determined relationship between the one or more parameters and the desired parameter, wherein the one or more models represent a performance of a device of the machinery;
   generate the desired parameter using the data and the one or more models;
   control a plurality of actuators coupled to the machinery based on the desired parameter;
   empirically tune the one or more models based on the data, the one or more parameters, and the desired parameter;
   compare the empirical tuning to a baseline tuning, wherein the baseline tuning comprises determining a preferred value of the desired parameter in a particular operation condition of the machinery;
   determine an operational state of the device based on the comparison; and
   provide the operational state of the device to a user of the device.

2. The system of claim 1, wherein the one or more parameters comprise one or more surrogate parameters.

3. The system of claim 1, wherein empirically tuning the one or more models comprises performing regression analysis.

4. The system of claim 1, wherein the baseline tuning comprises a model, a set of coefficients derived during an empirical tuning, or any combination thereof.

5. The system of claim 1, wherein the processor is configured to store the empirically tuned one or more models, a set of coefficients derived during the empirical tuning, or any combination thereof as the baseline tuning.

6. The system of claim 1, wherein the processor is configured to store the empirical tuning and the baseline tuning, and use the stored empirical tuning and baseline tuning to predict a future operational state of the device.

7. The system of claim 6, wherein the processor is configured to determine a suggested replacement date for the device.

8. A method, comprising:
receiving, via a processor included in a control system, data from a plurality of sensors coupled to machinery configured to produce power, the data corresponding to one or more parameters of the machinery;
selecting, via the processor, one or more models configured to generate a desired parameter of the machinery based on a determined relationship between the one or more parameters and the desired parameter, the one or more models representing a performance of a device of the machinery;
generating, via the processor, the desired parameter using the data and the one or more models;
performing, via the processor, regression analysis to update the one or more models using the data, the one or more models, and the desired parameter, wherein performing the regression analysis comprises calculating one or more coefficients;
comparing, via the processor, the updated one or more models, the one or more coefficients, or any combination thereof to a baseline tuning, wherein the baseline tuning comprises determining a preferred value of the desired parameter in a particular operation condition of the machinery;
determining, via the processor, an operational state of the device based on the comparison; and
providing the operational state of the device to a user of the device.

9. The method of claim 8, comprising using one or more surrogate parameters as the one or more parameters.

10. The method of claim 8, comprising adjusting, via the processor, the baseline tuning based on a result of the regression analysis.

11. The method of claim 8, comprising predicting, via the processor, a future operational state of the device based, at least in part, on the comparison.

12. The method of claim 8, wherein the baseline tuning comprises a model, a set of coefficients derived during an empirical tuning, or any combination thereof.

13. The method of claim 8, comprising storing, via the processor, a result of the regression analysis, the baseline tuning, or any combination thereof and performing a historical analysis based on, at least in part, the stored result and the stored baseline tuning.

14. The method of claim 8, comprising determining, via the processor, whether a portion of the received data is unsuitable and discarding the unsuitable portion.

15. A non-transitory, computer-readable medium comprising computer executable code comprising instructions configured to:
receive, via a processor included in a control system, one or more parameters of a machinery configured to produce power, one or more desired parameters of the machinery, and one or more models that represent a determined relationship between the one or more parameters and the one or more desired parameters and a performance of one or more devices of the machinery;
perform, via the processor, regression analysis to determine one or more coefficients to apply to the one or more models and adjust the one or more models using the one or more parameters, the one or more desired parameters, and the one or more models;
compare, via the processor, the one or more adjusted models, the one or more coefficients, or any combination thereof to a baseline model, a baseline set of coefficients, or any combination thereof, wherein the baseline model comprises a baseline tuning comprising determining a preferred value of the one or more desired parameters in a particular operation condition of the machinery;
determine, via the processor, an operational state of the one or more devices based on the comparison;
adjust, via the processor, the baseline model, the baseline set of coefficients, or any combination thereof based on a result of the regression analysis;
store, via the processor, the adjusted one or more models, the one or more coefficients, the adjusted baseline model, the adjusted baseline set of coefficients, or any combination thereof; and
provide the operational state of the device to a user of the device.

16. The non-transitory, computer-readable medium of claim 15, comprising instructions configured to perform, via the processor, a historical analysis based, at least in part, on the stored adjusted one or more models, the stored one or more coefficients, the stored adjusted baseline model, the stored adjusted baseline set of coefficients, or any combination thereof.

17. The non-transitory, computer-readable medium of claim 16, comprising instructions configured to predict, via the processor, a future operational state of the one or more devices.

18. The non-transitory, computer-readable medium of claim 16, comprising instructions configured to determine, via the processor, a suggested replacement date for the one or more devices based on the historical analysis.

19. The non-transitory, computer-readable medium of claim 15, comprising instructions to use, via the processor, one or more surrogate parameters as the one or more parameters.

20. The non-transitory computer-readable medium of claim 15, comprising instructions configured to determine, via the processor, whether a portion of the one or more parameters is unsuitable and discard the unsuitable portion.

* * * * *